United States Patent [19]

Uhrig et al.

[11] 4,403,077
[45] Sep. 6, 1983

[54] ANIONIC COMPOUNDS BASED ON MODIFIED NOVOLAK OXYALKYLATES, THEIR PREPARATION, AND THEIR USE AS FOAM-FREE SURFACE-ACTIVE AGENTS

[75] Inventors: Heinz Uhrig, Steinbach; Joachim Weide, Kelkheim; Reinhold Deubel, Bad Soden am Taunus, all of Fed. Rep. of Germany

[73] Assignee: Hoechst Aktiengesellschaft, Frankfurt am Main, Fed. Rep. of Germany

[21] Appl. No.: 380,995

[22] Filed: May 21, 1982

[30] Foreign Application Priority Data

May 23, 1981 [DE] Fed. Rep. of Germany ....... 3120697

[51] Int. Cl.$^3$ .................. C08G 8/30; C08F 283/00
[52] U.S. Cl. .................... 525/502; 252/8.7; 252/353; 525/505; 525/507
[58] Field of Search ............ 525/502, 505, 507; 528/129

[56] References Cited

U.S. PATENT DOCUMENTS

| | | | |
|---|---|---|---|
| 3,244,770 | 4/1966 | Kirkpatrick et al. | 525/502 |
| 3,283,030 | 11/1966 | Bean et al. | 525/502 X |
| 3,458,477 | 7/1969 | Ford et al. | 525/502 X |
| 3,888,828 | 6/1975 | Grossman et al. | 525/507 X |
| 4,032,514 | 6/1977 | Buriks et al. | 525/507 |
| 4,107,229 | 8/1978 | Tideswell et al. | 525/502 |

*Primary Examiner*—Lucille M. Phynes
*Attorney, Agent, or Firm*—Curtis, Morris & Safford

[57] ABSTRACT

The invention relates to novolak oxyalkylate mixed esters which, on the one hand, contain benzoyl and/or naphthoyl radicals and, on the other hand, contain maleic acid and/or sulfosuccinic acid half-ester groups. They are obtained by reacting novolak oxyalkylates with benzoic acid and/or naphthoic acid or with its anhydride or chloride on the one hand and maleic anhydride on the other hand and, if appropriate, reacting the maleic acid half-ester groups with sulfites to give sulfosuccinic acid half-ester groups. These compounds are highly suitable for use as dispersing agents for the preparation of low-foam dispersions of pigments, dyestuffs and other agents and as emulsifying, leveling and dyeing auxiliaries.

13 Claims, No Drawings

ANIONIC COMPOUNDS BASED ON MODIFIED NOVOLAK OXYALKYLATES, THEIR PREPARATION, AND THEIR USE AS FOAM-FREE SURFACE-ACTIVE AGENTS

This invention relates to compounds of the general formula I

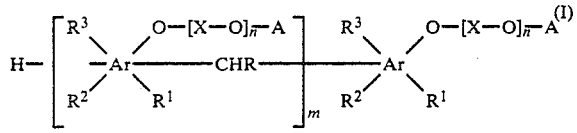

in which Ar denotes benzene or naphthalene, X denotes —$CH_2$—$CH_2$— and/or —$CH_2$—$CH(CH_3)$—, 0 to (m−1) of the radicals A denote hydrogen, 1 to m of the radicals A denote benzoyl and/or naphthoyl, 1 to m of the radicals A are —CO—CH=CH—COOM and/or —CO—$CH_2$—CH($SO_3$M)—COOM, in which M represents a cation, $R^1$, $R^2$ and $R^3$ denote hydrogen or alkyl having 1 to 14 C atoms, R denotes hydrogen and/or alkyl having 1 to 9 C atoms, n denotes a number from 1 to 150 and m denotes a number from 2 to 12.

U.S. Pat. Nos. 3,775,056 and 4,009,142 describe alkylphenol novolak oxyalkylate sulfosuccinates. These compounds are suitable for use as dispersing agents.

Alkylnaphthol novolak oxyalkylate sulfosuccinates have already been proposed.

In a particularly preferable embodiment of the invention, $R^1$ represents hydrogen, $R^2$ and $R^3$ represent hydrogen or alkyl having 1 to 12, advantageously 1 to 9, C atoms, R represents hydrogen and/or alkyl having 1 to 4 C atoms, advantageously hydrogen, n represents a number from 2 to 20, advantageously 8 to 20, m represents a number from 4 to 10, advantageously 4 to 8, and M represents hydrogen, an alkali metal, advantageously sodium, one equivalent of an alkaline earth metal and/or an ammonium group which can be substituted by lower alkyl and/or lower hydroxyalkyl or M represents an ammonium group obtained from ammonia or lower alkylamines by addition of up to 150, advantageously of 5 to 30, ethylene oxide and/or propylene oxide units.

The invention also relates to processes for preparing the compounds according to the invention, which processes comprise treating novolak oxyalkylates of the formula I in which A is hydrogen and Ar, X, $R^1$, $R^2$, $R^3$, R, n and m have the abovementioned meanings with 1 to m moles of an O-acylating compound which introduces the benzoyl and/or naphthoyl radical and with 1 to m moles of maleic anhydride and, if appropriate, 1 to m moles of sulfite or hydrogen sulfite or 0.5 to 0.5 m moles of disulfite and neutralizing any free acid groups present with a base which introduces the radical M.

Furthermore, the invention relates to the use of these compounds as surfactants, in particular as dispersing and distributing agents for the preparation of pigment dispersions having good flow and for finely dividing and stabilizing dyestuffs, and as wetting, emulsifying and leveling agents and as dyeing and coupling auxiliaries.

The starting materials are obtained by condensing alkylphenols or alkylnaphthols or their mixtures in a molar ratio of 3:2 to 17:16 with alkanals in the presence of acid catalysts to give novolak resins. These novolaks are more or less brittle, clear resins which in large blocks have a yellow brown color. The novolaks comprise mixtures of polynuclear alkylphenol or alkylnaphthol nuclei which are linked by alkylmethylene bridges. The composition depends above all on the ratio of alkylphenol or alkylnaphthol to aldehyde. Alkylene oxide is added to these resins in amounts of 1 to 150 moles, relative to each hydroxyl group, preferably in the presence of alkaline catalysts, and novolak resin oxyalkylates are formed.

Suitable starting compounds for the formation of novolak resins are alkylphenols, such as, for example, cresols, xylenols, octyl-, nonyl-, dodecyl-, tetradecyl-, dibutyl-, dioctyl-, dinonyl- and ditetradecyl-phenol or their mixtures and alkylnaphthols, such as, for example, octyl-, nonyl-, dodecyl-, dibutyl-, dioctyl-, dinonyl- and ditetradecyl-naphthol or their mixtures. Examples which may be mentioned of alkanals which can be used in the condensation are acetaldehyde, propionaldehyde and butyraldehyde, preferably formaldehyde and compounds which liberate aldehydes, such as paraformaldehyde, trioxane, tetraoxymethylene or paraldehyde. The catalysts used in a concentration of 0.1 to 5% by weight can be mineral acids, such as sulfuric acid or phosphoric acid, or sulfonic acids, such as dodecylbenzenesulfonic acid, or, preferably, hydrochloric acid, because it can readily be removed in the removal of water. The condensation is carried out under nitrogen at temperatures of 20° to 150° C., preferably 80° to 130° C. The water present after the condensation must be distilled off, in the final stages under reduced pressure (<66 mbar), until the water content in the resin is less than 0.3%.

The novolak resins are oxyalkylated by known methods, preferably with alkali metal hydroxides or alkali metal alkoxides as catalysts at 100° to 200° C., preferably at 140° to 180° C. The amount of ethylene oxide and/or propylene oxide is so chosen that the resulting addition products can form a stable emulsion, or are completely soluble, in water. 1 to 150, preferably 2 to 20, in particular 8 to 20, moles of ethylene oxide and/or propylene oxide are added onto each hydroxyl group of the novolak resins. The amount of alkylene oxide added depends on the intended use and hence on the degree of hydrophilic character desired. A suitable alkali metal hydroxide is potassium hydroxide or preferably sodium hydroxide, and a suitable alkali metal alkoxide is sodium methylate or sodium ethylate; the concentration should preferably be 0.05 to 1.0% by weight, relative to novolak resin, at the start of the oxyalkylation. The oxyalkylation can be carried out unpressurized or in pressure vessels with propylene oxide or preferably ethylene oxide or mixtures of the two, and the alkylene oxide can be added in a gaseous or liquid form. The operating pressure is 1 to 10 bar, preferably 2 to 4 bar.

The terminal hydroxyl groups are preferably esterified in two reaction stages. In the first reaction stage, some of the terminal hydroxyl groups, but at least one terminal hydroxyl group, are esterified with a compound which introduces the benzoyl radical or the naphthoyl radical, such as benzoic acid, α- or β-naphthoic acid, benzoic anhydride, benzoyl chloride, naphthoyl chloride, methyl benzoate or methyl naphthoate.

The esterification is effected, when benzoic acid or naphthoic acid is used, at 130° to 220° C., preferably 150° to 180° C., and, when benzoic anhydride is used, at as low as 20° to 100° C., preferably at 40° to 80° C., and subsequently, to react the resulting benzoic acid, likewise at 130° to 220° C. or preferably at 150° to 180° C. Examples of catalysts which can be used are benzene-sulfonic acid, p-toluenesulfonic acid, boric acid, tin powder, zinc chloride and sulfuric acid. The water which is formed in the reaction is removed by being distilled off, if necessary with the addition of an entraining agent, such as a hydrocarbon or chlorinated hydrocarbon. Esterification using benzoyl chloride or naphthoyl chloride is carried out at 30° to 100° C., preferably 45° to 55° C., in an inert solvent in the presence of alkali metal hydroxides or alkali metal carbonates. However, the terminal hydroxyl groups can also be partially esterified by transesterification with, for example, methyl benzoate in the presence of 0.1 to 1.0 mole of sodium methylate at 150° to 200° C., preferably at 160° to 190° C., while methanol is simultaneously distilled off.

In the second reaction stage, the remaining oxyalkylate terminal hydroxyl groups are reacted, if appropriate completely, to give maleic acid half-esters by mixing and stirring at 20° to 100° C., preferably 40° to 80° C., in the presence of alkali metal hydroxides the concentration of which should be 0.1 to 1.0% by weight, relative to the total mixture. Since maleic anhydride tends to sublime, it is advantageous to carry out the reaction in pressure vessels under an overpressure of 0.2 to 1.0 bar of nitrogen or air and to provide vigorous mixing since the molten maleic anhydride does not readily mix with the partially esterified oxyalkylates at the beginning of the reaction.

The conversion of the maleic acid half-esters into the corresponding sulfosuccinic acid half-esters takes place after the addition of aqueous solutions of sulfites or hydrogen sulfites. In this reaction, the quantity of the sulfite solutions can be so chosen that all maleic acid half-ester groups or only some are reacted. 1.0 to 1.5, preferably 1.05 to 1.1, equivalents of a sulfite, hydrogen sulfite or disulfite of an alkali metal or alkaline earth metal are used per maleic acid half-ester group to be reacted. While in this reaction the addition of aqueous solutions of sulfites produces the neutral salts of sulfosuccinic acid half-esters, the addition of aqueous solutions of hydrogen sulfites leads to the acid half-ester salts, which are preferably neutralized with alkylamines or alkylolamines or oxyalkylation adducts prepared therefrom. The amount of water added can be 50 to 85% by weight, relative to the total solution or mixture, and depends on the solubility of the maleic acid half-esters or the sulfosuccinic half-esters and on the viscosity of the solution. The reaction temperatures are 20° to 100° C., preferably 40° to 80° C. Representatives which may be mentioned of low-molecular alkylamines or alkylolamines are ethylamine, n-propylamine, isopropylamine, n-butylamine, isobutylamine, monoethanolamine, mono-n-propanolamine, monoisopropanolamine, mono-n-butanolamine, monoisobutanolamine, diethanolamine, di-n-propanolamine, di-n-butanolamine, triethanolamine, tripropanolamine and tributanolamine and oxyalkylation products which may be prepared therefrom and which contain 1 to 100 moles, preferably 5 to 30 moles, of ethylene oxide and/or propylene oxide added to 1 mole of the amines mentioned, and also di- and polyamines, such as ethylenediamine, diethylenetriamine, triethylenetetraamine, propylenediamine, dipropylenetriamine and tripropylenetetraamine.

The compounds according to the invention, and their mixtures, are surface-active substances which are extremely versatile. They give clear solutions in water and are almost if not completely colorless, according to the iodine color scale (DIN 6,162). They lower the surface tension, measured by the ring method (DIN 53,914), and, according to the Ross-Miles test (DIN 53,902), they are completely foam-free. Above all the derivatives of medium alkylphenols are distinguished by their heat resistance. They also wet cotton fabric in the dip wetting method (DIN 53,901) and are resistant to alkalis and strong acids under customary application conditions for surfactants.

The compounds according to the invention are highly suitable for use as dispersing agents for the preparation of low-foam dispersions of pigments, dyestuffs and optical brighteners and for making preparations of plant protection agents and pesticides, and also as emulsifying, leveling and dyeing auxiliaries for dyeing natural and synthetic fiber materials, such as cotton, wool, cellulose, viscose staple, cellulose acetate, cellulose triacetate, polyesters, polyamide and polyacrylonitrile or of fiber materials which contain these materials.

The compounds can be used, in emulsifying and dispersing agent preparations, on their own, as a mixture, or in combination with other surfactants, builders and other additives and auxiliaries.

The dispersing agents according to the invention are dilutable in any ratio with water and this makes them particularly suitable for preparing highly concentrated dispersions of organic and inorganic pigments, having good flow. Such pigment dispersions are prepared in a known way by dispersing the pigments, for example azo pigments, laked azo pigments, triphenylmethane pigments, thioindigo pigments, perylenetetracarboxylic acid pigments, dioxazine pigments, quinacridone pigments, phthalocyanine pigments or inorganic pigments together with the compounds according to the invention with the addition of ethylene glycol, water and, optionally, small amounts of other dispersing agents in a suitable dispersing device, for example a stirred ball mill or a divided trough kneader. The ratio of distributing agents to pigment powder can vary within wide limits and generally is 0.1 to 0.2 parts by weight of distributing agent per one part of dry pigment powder. The resulting pigment dispersions are suitable for coloring emulsion paints for internal and external use, for use in textile pigment printing or for use in aqueous flexographic or gravure printing inks. The outstanding wetting and dispersing properties of the dispersing agents described take effect when the quantities used are low, relative to the pigment contents in the dispersions. Pale and brilliant shades in flexographic and gravure printing are not impaired by the low coloration of the dispersing agents claimed.

The examples which follow serve to illustrate the invention in more detail. Parts and percentage data are by weight.

EXAMPLES

1. Preparation of novolaks

1.1. Pentanuclear nonylphenol novolak 1100 parts of nonylphenol, 126.3 parts of paraformaldehyde (95% strength) and 12.3 parts of concentrated hydrochloric acid were mixed at room temperature and stirred for 14 hours under reflux in a nitrogen atmosphere. Thereafter the internal temperature was increased to 135° C., and the reaction water was distilled off in the course of 4 hours. Stirring was then continued under a pressure of about 20 to 30 mbar for 2 hours at 135° to 140° C. Yield: about 1139 parts of novolak.

1.2. Pentanuclear nonyl-β-naphthol-novolak 1331 parts of nonyl-β-naphthol were initially introduced, and 132 parts of paraformaldehyde were added with slow stirring at room temperature. Stirring was carried out for 1 hour at 50° C. under a blanket of nitrogen, and, after the internal temperature had been increased to 90° C., 15.1 parts of concentrated hydrochloric acid were added dropwise. Thereafter stirring was carried out for 10 hours at 110° C. while at the same time nitrogen was passed through, and, after the internal temperature had been increased to 135° to 140° C., the reaction water was removed in the course of 4 hours. The pressure was then reduced to about 20 to 30 mbar and stirring was continued for 2 hours at 135° to 140° C. After cooling down, a dark red brown solid resin was obtained. Yield: about 1350 parts of novolak resin.

1.3. Heptanuclear p-cresol-novolak 728 parts of p-cresol, 189.5 parts of paraformaldehyde and 4.3 parts of concentrated hydrochloric acid were stirred for 15 hours under reflux and thereafter worked up, both steps being carried out as described in Example 1.1. Yield: about 750 parts of novolak resin.

1.4. Heptanuclear octylphenol-novolak 1428 parts of octylphenol, 189.5 parts of paraformaldehyde and 10.1 parts of 4-dodecylbenzenesulfonic acid were stirred for 14 hours under reflux and thereafter worked up, both steps being carried out as described in Example 1.1. Yield: about 1500 parts of novolak resin.

1.5. Heptanuclear nonylphenol-novolak 1540 parts of nonylphenol, 189.5 parts of paraformaldehyde and 10.9 parts of 4-dodecylbenzenesulfonic acid were stirred for 15 hours under reflux and thereafter worked up, both steps being carried out as described in Example 1.1. Yield: 1606 parts of a pale yellow brittle resin.

1.6. Technical heptanuclear nonylphenol-novolak 1831 parts of nonylphenol containing about 20% of the dinonyl compound, 189.5 parts of paraformaldehyde and 10.9 parts of 4-dodecylbenzenesulfonic acid were stirred for 14 hours under reflux and thereafter worked up, both steps being carried out as described in Example 1.1. Yield: about 1900 parts of novolak resin.

1.7. Nonanuclear nonylphenol-novolak 1980 parts of nonylphenol, 252.7 parts of paraformaldehyde and 13.9 parts of 4-dodecylbenzenesulfonic acid were stirred for 15 hours under reflux and thereafter worked up, both steps being carried out as described in Example 1.1. Yield: 2077 parts of resin.

2. Preparation of novolak oxyalkylates

2.1. Pentanuclear nonylphenol-novolak oxyethylate

After the addition of 1.1 parts of freshly pulverized sodium hydroxide, 200 parts of the pentanuclear novolak 1.1 were oxyethylated in a pressure vessel with stirring at 150° to 160° C. while 596.7 parts of ethylene oxide were passed in and a pressure of about 3 to 5 bar was maintained. After the total amount of ethylene oxide had been injected, the mixture was stirred for 1 hour at 150° to 160° C. The resin oxyethylate obtained corresponded to a pentanuclear nonylphenol-novolak containing 75 moles of ethylene oxide.

2.2. Pentanuclear nonyl-β-naphthol-novolak oxyethylate

After the addition of 1.1 parts of freshly pulverized sodium hydroxide, 200 parts of the pentanuclear novolak 1.2 were oxyethylated in a pressure vessel with stirring at 160° to 170° C. while 59.5 parts of ethylene oxide were passed in and a pressure of 3 to 5 bar was maintained. After the total amount of ethylene oxide had been injected, the mixture was stirred for 1 hour at 160° to 170° C. The resulting viscous oxyethylate contained 90 moles of ethylene oxide.

2.3. Heptanuclear p-cresol-novolak oxyethylate

After the addition of 1.0 part of pulverized sodium hydroxide, 200 parts of the heptanuclear p-cresol-novolak 1.3 were reacted as described in Example 2.1 with 531 parts of ethylene oxide. The resulting resin oxyethylate corresponded to a heptanuclear p-cresol-novolak oxyethylate containing 49 moles of ethylene oxide.

2.4. Heptanuclear octylphenol-novolak oxyethylate

After the addition of 1.2 parts of freshly pulverized sodium hydroxide, 200 parts of the heptanuclear octylphenol-novolak 1.4 were reacted as described in Example 2.1 with 544 parts of ethylene oxide. The resulting resin oxyethylate corresponded to a heptanuclear octylphenol-novolak oxyethylene containing 100 moles of ethylene oxide.

2.5. Heptanuclear nonylphenol-novolak oxyethylate

After the addition of 1.2 parts of sodium hydroxide, 200 parts of the heptanuclear novolak 1.5 were reacted as described in Example 2.1 with 568.9 parts of ethylene oxide. The resulting resin oxyethylate corresponded to a heptanuclear nonylphenol-novolak containing 105 moles of ethylene oxide.

2.6. Technical heptanuclear nonylphenol-novolak oxyethylate

After the addition of 1.2 parts of freshly pulverized sodium hydroxide, 200 parts of the technical heptanuclear nonylphenol-novolak 1.6 were reacted as described in Example 2.1 with 573.8 parts of ethylene oxide. The resulting resin oxyethylate corresponded to a technical heptanuclear nonylphenol-novolak containing 125 moles of ethylene oxide.

2.7. Technical heptanuclear nonylphenol-novolak oxyethylate/oxypropylate

After the addition of 4.5 parts of sodium methylate, 200 parts of the technical heptanuclear nonylphenol-novolak 1.6 were oxyalkylated in a pressure vessel with stirring at 145° to 170° C. while 292.6 parts of propylene oxide and 444.4 parts of ethylene oxide were passed in and a pressure of about 4.4 to 6.0 bar was maintained. After the total amount of alkylene oxide had been injected, the mixture was stirred for 1 hour at 150° to 160° C. The resulting resin oxyalkylate corresponded to a technical heptanuclear nonylphenol-novolak oxyalkylate containing 48.3 moles of propylene oxide and 96.7 moles of ethylene oxide.

2.8. Nonanuclear nonylphenol-novolak oxyethylate

After the addition of 1.0 part of sodium hydroxide, 200 parts of the nonanuclear nonylphenol-novolak 1.7 were oxyethylated as described in Example 2.1 with 567.8 parts of ethylene oxide. The resulting resin oxyethylate corresponded to a nonanuclear nonylphenol-novolak containing 135 moles of ethylene oxide.

3. Preparation of novolak oxyalkylate mixed ester sulfosuccinates

3.1. Pentanuclear nonylphenol-novolak oxyethylate mixed ester sulfosuccinate 300 parts of the oxyethylate 2.1 and 15.2 parts of benzoic anhydride were thoroughly mixed at room temperature and stirred for 3.5 hours at 70° to 80° C. under a blanket of nitrogen. After the addition of 0.06 part of p-toluenesulfonic acid and 100 parts by volume of xylene, the reaction water was removed in the course of 8 hours at 150° to 160° C. by continuous separation (azeotropic distillation and return of the xylene). After the entraining agent had been distilled off and an acid number (DIN 53,402) of less than 5 had been reached, 20.6 parts of maleic anhydride were added and esterified for a further 3.5 hours at 70° to 80° C. under a blanket of nitrogen. A solution of 26.5 parts of sodium sulfite and 523 parts of water was then allowed to run in, and stirring was carried out for 60 to 120 minutes at 70° to 80° C. until the batch had formed a clear aqueous solution. The amount of water added can be between 50 and 85% of the final solution.

3.2. Pentanuclear nonyl-β-naphthol-novolak oxyethylate mixed ester sulfosuccinate 500 parts of the pentanuclear nonyl-β-naphthol-novolak oxyethylate 2.2 were esterified analogously to compound 3.1 with 21.3 parts of benzoic anhydride and the product was reacted with 29.2 parts of maleic anhydride and a solution of 37.5 parts of sodium sulfite in 882 parts of water to give the sulfosuccinate. The amount of water added can be between 50 and 85% of the final solution.

3.3. Heptanuclear p-cresol-novolak oxyethylate mixed ester sulfosuccinate 148.4 parts of the heptanuclear p-cresol-novolak oxyethylate 2.3 were esterified as described in Example 3.1 with 17.0 parts of benzoic anhydride and the product was then reacted with 20.6 parts of maleic anhydride and a solution of 26.5 parts of sodium sulfite in 318.7 parts of water. The amount of water added can be between 50 and 85%.

3.4. Heptanuclear octylphenol-novolak oxyethylate mixed ester sulfosuccinate 300.9 parts of the heptanuclear octylphenolnovolak oxyethylate 2.4 were esterified as described in Example 3.1 with 18.3 parts of benzoic acid at 150° to 160° C. and the product was then reacted with 20.6 parts of maleic anhydride and a solution of 26.5 parts of sodium sulfite in 549.3 parts of water. The amount of water added can be between 50 and 85%.

3.5. Heptanuclear nonylphenol-novolak oxyethylate mixed ester sulfosuccinates

3.5.1.

After the addition of 17 parts of benzoic anhydride, 312 parts of the oxyethylate 2.5 were esterified as described in Example 3.1 down to an acid number of 15, before the addition of 20.6 parts of maleic anhydride after a further 3.5 hours and of a solution of 26.5 parts of sodium sulfite and 575.4 parts of water effected the conversion to the sulfosuccinate. The amount of water added can be between 50 and 85% of the final solution.

3.5.2.

312 parts of the heptanuclear novolak oxyethylate 2.5 were stirred with 26.5 parts of methyl benzoate in the presence of 1.5 parts of sodium ethylate under reflux for 24 hours at 200° C. After methanol had been distilled off (acid number 2), the conversion to the sulfosuccinate was effected analogously to Example 3.5.1 by the addition of 15.4 parts of maleic anhydride and of a solution of 19.8 parts of sodium sulfite in 571 parts of water. The amount of water added can be between 50 and 85% of the final solution.

3.5.3.

312 parts of the heptanuclear nonylphenol-novolak oxyethylate 2.5 were dissolved in 450 parts of acetone, and while the solution was being efficiently stirred in the presence of 32 parts of pulverulent potassium carbonate, 21 parts of benzoyl chloride were gradually added at room temperature. The mixture was then slowly warmed to 45° to 55° C. and stirred for 4 hours under reflux at the same temperature. After the salts had been separated off, the acetone was distilled off in vacuo, and the residue was taken up in ether and washed with water. The ether phase was then dried, and the ether was removed by distillation. 259 parts of the benzoate thus prepared were reacted as described in Example 3.1 with 19.4 parts of maleic anhydride and a solution of 25.0 parts of sodium sulfite in 509 parts of water. The amount of water added can be between 50 and 85%.

3.5.4.

312 parts of the heptanuclear nonylphenol-novolak oxyethylate 2.5 were esterified as described in Example 3.1 with 11.2 parts of benzoic anhydride down to an acid number of 21 and the product was then reacted with 25.75 parts of maleic anhydride and a solution of 33.1 parts of sodium sulfite in 551 parts of water. The amount of water added can be between 50 and 85%.

3.5.5.

312 parts of the heptanuclear nonylphenol-novolak oxyethylate 2.5. were esterified as described in Example 3.5.1 with 17 parts of benzoic anhydride and 20.6 parts of maleic anhydride and the product was reacted with a solution of 21.9 parts of sodium hydrogen sulfite in 563 parts of water at 70° to 80° C. and stirred for 60 to 120 minutes until the batch had formed a clear aqueous solution. The still acid sulfosuccinic acid half-ester salt was then neutralized with 236 parts of an alkylolamine oxyethylate formed from monoethanolamine and 20 moles of ethylene oxide. The amount of water added can be between 50 and 85%.

3.5.6.

312 parts of the heptanuclear nonylphenol-novolak oxyethylate 2.5 were esterified as described in Example 3.5.1 with 17 parts of benzoic anhydride and 20.6 parts of maleic anhydride and the product was reacted with a solution of 21.9 parts of sodium hydrogen sulfite in 563 parts of water at 70° to 80° C. and stirred for 60 to 120 minutes until the batch had formed a clear aqueous solution. The still acid sulfosuccinic acid half-ester salt was then neutralized with 192 parts of an alkylolamine oxyethylate formed from diethanolamine and 15 moles of ethylene oxide. The amount of water added can be between 50 and 85%.

3.5.7.

312 parts of the heptanuclear nonylphenol-novolak oxyethylate 2.5 were esterified as described in Example 3.5.1 with 17 parts of benzoic anhydride and 20.6 parts of maleic anhydride and the product was reacted with a solution of 21.9 parts of sodium hydrogen sulfite in 563 parts of water at 70° to 80° C. and stirred for 60 to 120 minutes until the batch had formed a clear aqueous solution. The still acid sulfosuccinic acid half-ester salt was then neutralized with 177.9 parts of an alkylolamine oxyethylate formed from triethanolamine and 15 moles of ethylene oxide. The amount of water added can be between 50 and 85%.

3.5.8.

312 parts of the heptanulcear nonylphenol-novolak oxyethylate 2.5 were esterified down to an acid number of 5 with 17.2 parts of 1-naphthoic acid in the presence of 1.5 parts of p-toluenesulfonic acid while at the same time the reaction water was continuously separated off with 100 parts by volume of xylene for 8 hours at 160° to 165° C. under a nitrogen atmosphere. After the entraining agent had been removed, 27.5 parts of maleic anhydride and a solution of 33.1 parts of sodium sulfite in 585 parts of water were added as described in Example 3.5.1 and the mixture was stirred for 60 to 120 minutes until the batch had formed a clear aqueous solution. The amount of water added can be between 50 and 85% of the final solution.

3.6. Technical heptanuclear nonylphenol-novolak oxyethylate mixed ester sulfosuccinate 370.6 parts of the technical heptanuclear nonylphenol-novolak oxyethylate 2.6 were esterified as described in Example 3.1 with 16.8 parts of benzoic anhydride and the product was then reacted with 19.6 parts of maleic anhydride and a solution of 25.2 parts of sodium sulfite in 648 parts of water. The amount of water added can be between 50 and 85%.

3.7. Technical heptanulcear nonylphenol-novolak oxyethylate/oxypropylate mixed ester sulfosuccinate 448.6 parts of the technical heptanuclear nonylphenol-novolak oxyalkylate 2.7 were esterified as described in Example 3.1 with 17 parts of benzoic anhydride and the product was then reacted with 20.6 parts of maleic anhydride and a solution of 26.5 parts of sodium sulfite in 769 parts of water. The amount of water added can be between 50 and 85%.

3.8. Nonanuclear nonylphenol-novolak oxyethylate mixed ester sulfosuccinate 500 parts of the nonanuclear nonylphenol-novolak oxyethylate 2.8 were esterified as described in Example 3.1 down to an acid number of 6 after the addition of 27.7 parts of benzoic anhydride and the product was then reacted with 31.5 parts of maleic anhydride and a solution of 40.5 parts of sodium sulfite in 400 parts of water to give the corresponding sulfosuccinate. The amount of water added can be between 50 and 85% of the final solution.

4. Application examples

The use of the substances according to the invention as dispersing agents for pigment dispersions which have good flow is further illustrated in the examples below without being limited to them.

4.1.

4.1.1.

520 parts of Pigment Red 12 (Color Index Number 12,370) were vigorously kneaded together with 171 parts of a 42% strength aqueous solution of the surfactant according to preparation Example 3.1, 35 parts of ethylene glycol and 40 parts of water, in a divided trough kneader for about one hour. After a state of fine division had been reached, the mixture was diluted by adding a further 125 parts of ethylene glycol and 109 parts of water. The 52% strength pigment preparation had good flow and was highly suitable for coloring aqueous paints and for use in coloring paper pulp.

4.1.2.

A pigment dispersion having similar good properties was obtained when the 171 parts of the surfactant according to preparation Example 3.1 were replaced by 171 parts of a 42% strength aqueous solution of the surfactant according to preparation Example 3.5.1.

4.2.

If, in application Example 4.1.1, 195 parts of a 37% strength aqueous solution of the surfactant according to preparation Example 3.5.3 were used instead of the 171 parts of the aqueous solution of the surfactant according to preparation Example 3.1 and the proportion of water was reduced by 24 parts, a pigment dispersion was obtained which had comparably good application properties.

4.3.

4.3.1.

400 parts of Pigment Yellow 16 (Color Index Number 20,040) were ground to the required state of fine division in a stirred ball mill by means of 1 mm Siliquarzit glass beads together with 121 parts of a 43% strength aqueous solution of the surfactant according to preparation Example 3.5.4, 200 parts of ethylene glycol and 110 parts of water. A further 169 parts of water were then added to the ground material, and the fluid pigment dispersion was separated from the grinding medium by means of a sieve. It was possible to dilute the 40% strength pigment dispersion further with water in any ratio and the dispersion is particularly suitable for coloring water-containing binder systems.

4.3.2.

Pigment dispersions having similar good properties were obtained when the 121 parts of surfactant according to preparation Example 3.5.4 were replaced by 121 parts of a 43% strength aqueous solution of the surfactant according to preparation Example 3.5.8.

4.4.

450 parts of Pigment Red 9 (Color Index Number 12,460) were ground in a stirred ball mill by means of 1 mm Siliquarzit glass beads together with 121 parts of a 39% strength aqueous solution of the surfactant according to preparation Example 3.5.1, 10 parts of a commercially available mixture of sodium naphthalenesulfonate/formaldehyde condensation products

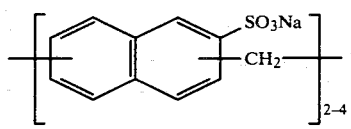

200 parts of ethylene glycol and 138 parts of water, and thereafter the ground material was diluted with 80 parts of water. This fluid pigment dispersion is highly suitable for coloring aqueous flexographic and gravure printing inks and for pigmenting aqueous paints based on plastic dispersions.

4.5.

500 parts of Pigment Orange 5 (Color Index Number 12,075) were vigorously kneaded for one hour in a divided trough kneader together with 153 parts of a 39% strength aqueous solution of the surfactant according to preparation Example 3.5.1, 10 parts of a mixture of sodium dimethylnaphthalenesulfonate/formaldehyde condensation products

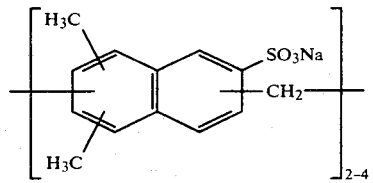

and 200 parts of ethylene glycol. After the pigment had been dispersed, 137 parts of water were added to establish a pigment content of 50%. The pigment dispersion, which has good flow and fastness to storing, is particularly suitable for coloring aqueous flexographic and gravure printing inks and for use in the coloring of paper pulp.

4.6.

500 parts of Pigment Blue 15 (Color Index No. 74,160), 179 parts of a 39% strength aqueous solution of the surfactant according to preparation Example 3.5.1, 20 parts of the Na naphthalenesulfonate/formaldehyde condensation product used in Example 4.4, 150 parts of ethylene glycol and 115 parts of water were ground in a stirred ball mill by means of 1 mm Siliquarzit glass beads and the ground material was then diluted by adding 40 parts of water. The resulting pigment dispersion, which has very good flow, is highly suitable for use in aqueous flexographic and gravure printing inks.

5. Test examples

The test methods described below were used to test the dispersing properties of the substances according to the invention:

For carrying out comparative grinding experiments, corresponding to U.S. Pat. No. 3,775,056 about 4 g of the dyestuff C.I. Disperse Red 65 (C.I. No. 11,228) were ground with the compound under test, water and 50 g of Sili-Quarzit beads having a diameter of 1 mm, by means of a 2-disk stirrer similar to customary stirrers in stirred ball mills, in a small cylinder equipped with a laboratory stirring motor, with cooling. The progress of the fine dividing was monitored at regular intervals by means of filter paper spot tests and microscopic examination, and the quality of the dispersion was assessed on a 5 point scale (1 denotes very poor and 5 denotes very good). It was possible to assess the fastness to storing by diluting the samples to the dyestuff concentration desired, storing the samples at 50° C. in a drying cabinet and repeating the filter paper spot tests after, for example, 1, 3 and 6 weeks' storage.

As a measure of the dyeing behavior at 106° C. a polyester/wool blend, and for the behavior at 130° C. polyester, were dyed by known processes. In Table 1 below, the result is defined by the numbers 1 to 5 and 1 denotes no dyeing behavior
2 denotes slight
3 denotes utilizable
4 denotes good
5 denotes very good While Table 1 shows the dispersing properties, the surface-active properties are indicated in Table 2 according to the following DIN standards: wetting power: DIN 53,901, foaming behavior: DIN 53,902, surface tension: DIN 53,914 and iodine color number: DIN 6,162.

The foaming behavior was assessed according to the classification

0—non-foaming
1—slight
2—slight/medium
3—medium
4—strong.

TABLE 1

| Compound | Grinding time [h] | Quality of the dispersion | Stability after 6 weeks' storage | Polyester/wool dyeing at 106° C. | Polyester dyeing at 130° C. |
| --- | --- | --- | --- | --- | --- |
| 3.1 | 4 | 5 | 4–5 | 5 | 5 |
| 3.2 | 4 | 5 | 5 | 4–5 | 5 |
| 3.3 | 4.5 | 5 | 4–5 | 5 | 5 |
| 3.4 | 4 | 5 | 5 | 4–5 | 5 |
| 3.5.1 | 5 | 5 | 4–5 | 5 | 5 |
| 3.5.2 | 5 | 4 | 4–5 | 5 | 5 |
| 3.5.3 | 6 | 4–5 | 4–5 | 4–5 | 5 |
| 3.5.4 | 5 | 4–5 | 4–5 | 5 | 5 |
| 3.5.5 | 4 | 5 | 4–5 | 5 | 5 |
| 3.5.6 | 4 | 5 | 4–5 | 5 | 5 |
| 3.5.7 | 4 | 5 | 4–5 | 5 | 5 |
| 3.5.8 | 4 | 5 | 5 | 4–5 | 5 |
| 3.6 | 4 | 5 | 5 | 5 | 5 |
| 3.7 | 5 | 4–5 | 4–5 | 4–5 | 5 |
| 3.8 | 4 | 4 | 4 | 4–5 | 5 |

TABLE 2

| Compound | Wetting power (seconds) at 70° C. | Foaming behavior C = 2 g/l | Surface tension [$10^{-3}$ N/m]; C = 2 g/l | Iodine color number C = 2 g/l |
| --- | --- | --- | --- | --- |
| 3.1 | — | 0 | 50.3 | 1 |
| 3.2 | — | 1 | 50.5 | 5 |
| 3.3 | 142 | 0–1 | 47.5 | 1.5 |
| 3.4 | 71 | 1 | 41.0 | 1 |
| 3.5.1 | 235 | 0 | 43.1 | 1 |
| 3.5.2 | 160 | 0 | 56.4 | 1 |
| 3.5.3 | 140 | 0 | 48.1 | 1 |
| 3.5.4 | 125 | 0–1 | 49.8 | 1 |
| 3.5.5 | 145 | 0–1 | 47.2 | 1 |
| 3.5.6 | 136 | 0 | 45.3 | 1 |
| 3.5.7 | 122 | 0 | 42.0 | 1 |
| 3.5.8 | 300 | 0 | 47.5 | 1 |
| 3.6 | 135 | 0–1 | 45.3 | 1.5 |
| 3.7 | 145 | 0–1 | 43.3 | 1 |

| Compound | Wetting power (seconds) at 70° C. | Foaming behavior C = 2 g/l | Surface tension [10⁻³ N/m]; C = 2 g/l | Iodine color number C = 2 g/l |
| --- | --- | --- | --- | --- |
| 3.8 | 225 | 0 | 36.6 | 1 |

We claim:

1. Compound of the formula I

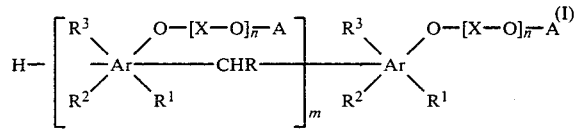

in which Ar denotes benzene or naphthalene, X denotes $-CH_2-CH_2-$ and/or $-CH_2-CH(CH_3)-$, 0 to $(m-1)$ of the radicals A denote hydrogen, 1 to m of the radicals A denote benzoyl and/or naphthoyl, 1 to m of the radicals A are $-CO-CH=CH-COOM$ and/or $-CO-CH_2-CH(SO_3M)-COOM$, in which M represents a cation, $R^1$, $R^2$ and $R^3$ denote hydrogen or alkyl having 1 to 14 C atoms, R denotes hydrogen and/or alkyl having 1 to 9 C atoms, n denotes a number from 1 to 150 and m denotes a number from 2 to 12.

2. A compound as claimed in claim 1, in which $R^1$ denotes hydrogen, $R^2$ and $R^3$ denote hydrogen or alkyl having 1 to 12 C atoms, R denotes hydrogen and/or alkyl having 1 to 4 C atoms, n denotes a number from 2 to 20, m denotes a number from 4 to 10 and M denotes hydrogen, an alkali metal, one equivalent of an alkaline earth metal and/or an ammonium group which can be substituted by lower alkyl and/or lower hydroxyalkyl or M denotes an ammonium group obtained from ammonia or lower alkylamines by addition of up to 150 ethylene oxide and/or propylene oxide units.

3. A compound as claimed in claim 1, in which R denotes hydrogen and M denotes hydrogen, sodium and/or an ammonium group which can be substituted by lower alkyl and/or hydroxyalkyl or M denotes an ammonium group obtained from ammonia or lower alkylamine by addition of 5 to 30 ethylene oxide and/or propylene oxide units.

4. A compound as claimed in claim 3, in which Ar denotes benzene, $R^2$ and $R^3$ denote hydrogen or alkyl having 1 to 9 C atoms, n denotes a number from 8 to 20 and m denotes a number from 4 to 8.

5. A compound as claimed in claim 3, in which Ar denotes naphthalene, $R^2$ and $R^3$ denote hydrogen or alkyl having 1 to 9 C atoms, n denotes a number from 8 to 20 and m denotes a number from 4 to 8.

6. A process for preparing a compound as claimed in claims 1 or 5, which process comprises treating a compound of the formula I in which A is hydrogen with 1 to m moles of an O-acylating compound which introduces the benzoyl and/or naphthoyl radical and with 1 to m moles of maleic anhydride and, if appropriate, 1 to m moles of sulfite or hydrogen sulfite or 0.5 to 0.5 m moles of disulfite and neutralizing any free acid group present with a base which introduces the radical M.

7. The process as claimed in claim 6, wherein a compound of the formula I in which A is hydrogen is reacted with benzoic acid, naphthoic acid or the corresponding acid chlorides or anhydrides in the presence of acid catalysts.

8. The process as claimed in claim 6, wherein a compound of the formula I in which A is hydrogen is reacted with lower alkyl esters of benzoic acid or naphthoic acid in the presence of basic catalysts.

9. The process as claimed in claims 6 or 8, wherein as sulfite or hydrogen sulfite or disulfite the respective sodium salt is used.

10. The method of using a compound as claimed in claim 1, as a surface-active agent.

11. The method of using a compound as claimed in claim 1, as a coupling auxiliary.

12. The method of using a compound as claimed in claim 1, as a dispersing and distributing agent.

13. The method of using a compound as claimed in claim 1, as a wetting, emulsifying, leveling and dyeing auxiliary.

* * * * *